US012640472B2

(12) United States Patent
Lipson et al.

(10) Patent No.: US 12,640,472 B2
(45) Date of Patent: May 26, 2026

(54) BEAM STEERING AND RECEIVING METHOD BASED ON AN OPTICAL SWITCH ARRAY

(71) Applicant: The Trustees of Columbia University in the City of New York, New York, NY (US)

(72) Inventors: Michal Lipson, New York, NY (US); Christopher Thomas Phare, New York, NY (US); You-Chia Chang, New York, NY (US); Steven A. Miller, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 238 days.

(21) Appl. No.: 18/626,158

(22) Filed: Apr. 3, 2024

(65) Prior Publication Data

US 2024/0275044 A1     Aug. 15, 2024

Related U.S. Application Data

(63) Continuation of application No. 17/275,753, filed as application No. PCT/US2019/051079 on Sep. 13, 2019, now Pat. No. 11,984,665.

(Continued)

(51) Int. Cl.
H01Q 3/38 (2006.01)
G01S 17/10 (2020.01)
(Continued)

(52) U.S. Cl.
CPC .............. H01Q 3/38 (2013.01); G01S 17/10 (2013.01); G01S 17/42 (2013.01); G01S 17/89 (2013.01); H01Q 3/40 (2013.01)

(58) Field of Classification Search
CPC .......... G01S 17/10; G01S 17/42; G01S 17/89; H04Q 11/0005; H01Q 3/40; H01Q 3/38
See application file for complete search history.

(56) References Cited

U.S. PATENT DOCUMENTS 5,889,898 A     3/1999   Koren et al.
6,268,952 B1    7/2001   Godil et al.
(Continued)

FOREIGN PATENT DOCUMENTS

CN     101283303 A     10/2008
CN     102243341 A     11/2011
(Continued)

OTHER PUBLICATIONS

Arbabi et al., "Miniature optical planar camera based on a wide-angle metasurface doublet corrected for monochromatic aberration," Nature Communications, 2016, vol. 7, Issue 13682, pp. 1-29.

(Continued)

*Primary Examiner* — Khanh C Tran
(74) *Attorney, Agent, or Firm* — BakerHostetler

(57)     ABSTRACT

An optical apparatus comprising an optical switch array comprising a plurality of optical switches configured to selectively route light through one or more of a plurality of waveguides, a plurality of emitters, wherein at least one emitter of the plurality of emitters is disposed in communication with the one or more of the plurality of waveguides and configured to receive light and cause at least a portion of the light to exit the waveguide, and a lens disposed to receive light exiting the one or more of a plurality of waveguides via the at least one emitter, wherein the lens is configured to direct the received light as an optical output, and wherein the position of the at least one emitter relative to the lens facilitates beam steering of the optical output.

19 Claims, 5 Drawing Sheets

Related U.S. Application Data

(60) Provisional application No. 62/731,151, filed on Sep. 14, 2018.

(51) Int. Cl.
G01S 17/42        (2006.01)
G01S 17/89        (2020.01)
H01Q 3/40         (2006.01)

(56)         References Cited

U.S. PATENT DOCUMENTS

| | | | |
|---|---|---|---|
| 7,649,665 B2 | 1/2010 | Kempa et al. | |
| 7,741,618 B2 | 6/2010 | Lee et al. | |
| 8,891,069 B2 | 11/2014 | Pedersen et al. | |
| 9,091,817 B2 | 7/2015 | Wagener et al. | |
| 2005/0163507 A1 | 7/2005 | Joo et al. | |
| 2007/0122155 A1 | 5/2007 | Hillis et al. | |
| 2007/0140618 A1 | 6/2007 | Doerr et al. | |
| 2015/0212275 A1 | 7/2015 | Mao et al. | |
| 2016/0025914 A1 | 1/2016 | Brongersma et al. | |
| 2017/0299697 A1 | 10/2017 | Swanson | |
| 2018/0136540 A1 | 5/2018 | Park | |
| 2018/0175961 A1* | 6/2018 | Spector | G02B 6/3526 |
| 2018/0211158 A1 | 7/2018 | Shainline et al. | |
| 2018/0239021 A1 | 8/2018 | Akselrod et al. | |
| 2020/0259256 A1* | 8/2020 | Yu | G01S 17/26 |
| 2021/0048724 A1* | 2/2021 | Bogaerts | G02B 26/10 |
| 2021/0293934 A1* | 9/2021 | Sun | G01S 7/4911 |
| 2022/0146903 A1* | 5/2022 | Watts | H04B 10/1123 |

FOREIGN PATENT DOCUMENTS

| | | |
|---|---|---|
| CN | 104808293 A | 7/2015 |
| TW | 546498 B | 8/2003 |

OTHER PUBLICATIONS

Cai et al., "Integrated Compact Optical Vortex Beam Emitters," Science, 2012, vol. 338, pp. 363-366.

Gissibl et al., "Two-photon direct laser writing of ultracompact multi-lens objectives," Nature Photonics, 2016, vol. 10, pp. 554-560.

Hao et al., "Ultra-low power anti-crosstalk collision avoidance light detection and ranging using chaotic pulse position modulation approach," Chinese Physics B, vol. 25, Issue 7, 2016.

Hutchison et al., "High-resolution aliasing-free optical beam steering" Optica., 2016, vol. 3, pp. 887-890.

Poulton et al., "Coherent solid-state LiDAR with silicon photonic optical phased arrays," Optics Letters, vol. 42, Issue 20, (2017), pp. 4091-4094.

Sher et al., "Low intensity LiDAR using compressed sensing and a photon number resolving detector," SPIE Conference Proceeding, vol. 10546, 2018.

* cited by examiner

BEAM STEERING AND RECEIVING METHOD BASED ON AN OPTICAL SWITCH ARRAY

CROSS-REFERENCE TO RELATED APPLICATION

This application is a Continuation application of U.S. patent application Ser. No. 17/275,753, filed Mar. 12, 2021, which is the National Stage Application of International Patent Application No. PCT/US2019/051079, filed Sep. 13, 2019, which claims priority to and the benefit of U.S. patent application 62/731,151, "Beam Steering and Receiving Method Based on An Optical Switch Array" (filed Sep. 14, 2018), the entirety of each foregoing application is incorporated herein by reference for any and all purposes.

STATEMENT OF GOVERNMENT SUPPORT

This invention was made with government support under award HR0011-16-C-0107 awarded by DOD/DARPA. The government has certain rights in the invention.

TECHNICAL FIELD

The present disclosure relates to optical apparatuses, more particularly to beam steering and to receiving methods using an optical switch array.

BACKGROUND

Free-space beam steering and receiving has wide applications, including LIDAR (Light Detection And Ranging), free-space communications, and remote sensing. Optical phased arrays have been the conventional method to realize a miniature beam-steering and receiving device without moving parts. See D. N. Hutchison, J. Sun, J. K. Doylend, R. Kumar, J. Heck, W. Kim, C. T. Phare, A. Feshali, and H. Rong, "High-resolution aliasing-free optical beam steering," *Optica* 3, 887-890 (2016); see also, C. V. Poulton, A. Yaacobi, D. B. Cole, M. J. Byrd, M. Raval, D. Vermeulen, and M. R. Watts, "Coherent solid-state LIDAR with silicon photonic optical phased arrays," *Opt. Lett.* 42, 4091-4094 (2017).

The power consumption of an optical phased array is, however, proportional to the number of emitters (denoted by n) in the array. As a consequence, large-scale optical phased arrays can be complex in their construction and can also consume a significant amount of power. Accordingly, there is a need in the art for improved systems.

SUMMARY

In meeting these long-felt needs, the present disclosure provides, in one aspect, optical apparatuses and methods of making and using the same. In certain aspects, a beam steering and receiving method is disclosed based on an optical switch array. This method consumes less power than conventional beam-steering and receiving method based on an optical phased array. The disclosed approach also allows for straightforward feedback control and therefore better robustness to environmental temperature change.

By contrast to the conventional methods, the power consumption of the methods and apparatuses disclosed here scales as $\log_2 n$. As a result, the methods and apparatuses of the present disclosure can consume less power as compared to similar configurations that use conventional phased arrays, particularly in systems that feature a comparatively large number of emitters.

The present disclosure also provides systems, the systems including a processor that executes stored instructions for executing the steps of the method. The above and other characteristic features of the invention will be apparent from the following detailed description of the invention.

In one aspect, the present disclosure provides an optical apparatus comprising: an optical switch array comprising a plurality of optical switches configured to selectively route light to one or more of a plurality of waveguides; a plurality of emitters, wherein at least one emitter of the plurality of emitters is disposed in communication with the one or more of the plurality of waveguides and configured to receive light and cause at least a portion of the light to exit the waveguide; and a lens disposed to receive light exiting the one or more of a plurality of waveguides via the at least one emitter, wherein the lens is configured to direct the received light as an optical output, and wherein the position of the at least one emitter relative to the lens facilitates beam steering of the optical output.

The present disclosure also provides an optical apparatus comprising: an optical switch array comprising a plurality of optical switches configured to selectively route light to one or more of a plurality of waveguides; a plurality of receivers, wherein at least one receiver of the plurality of receivers is disposed in communication with the one or more of the plurality of waveguides and configured to receive light and cause at least a portion of the light to be coupled to the one or more of the plurality of waveguides; and a lens disposed to receive light and to direct light toward the at least one receiver, wherein the lens is configured to direct the received light as an optical input to the at least one receiver, and wherein the position of the at least one receiver relative to the lens facilitates receipt of the directional beam optical input.

Further provided are methods of making and using the apparatuses disclosed herein.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document. In the drawings.

DETAILED DESCRIPTION OF ILLUSTRATIVE EMBODIMENTS

The present disclosure may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention.

Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable, and it should be understood that steps can be performed in any order.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any sub combination. All documents cited herein are incorporated herein in their entireties for any and all purposes.

Further, reference to values stated in ranges include each and every value within that range. In addition, the term "comprising" should be understood as having its standard, open-ended meaning, but also as encompassing "consisting" as well. For example, a device that comprises Part A and Part B may include parts in addition to Part A and Part B, but can also be formed only from Part A and Part B.

Figures 1A, 1B:
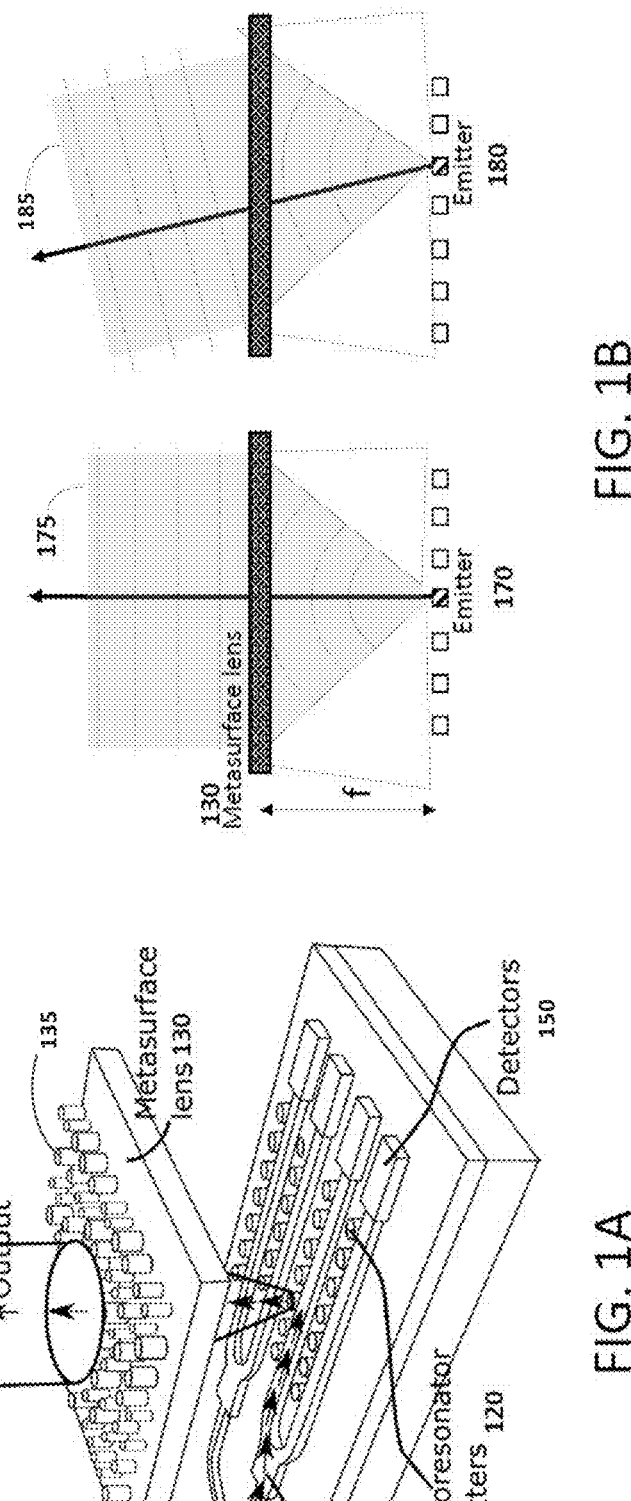
FIG. 1A illustrates a schematic representation of a beam-steering device based on an optical switch array in accordance with aspects of the present disclosure.
FIG. 1B illustrates a schematic representation that shows steering to different beam directions by switching to different emitters of the beam steering device of FIG. 1A.

FIG. 1A depicts a beam-steering and receiving device 100 comprising an optical switch array 110, multiple emitters 120, and lens 130. The optical switch array can comprise one or more rows of emitters, which emitters can receive light from an input 140. In some embodiments, the emitters are microresonator emitters. In some embodiments, the emitters can comprise a microresonant cavity formed as a ring or a disk. As such, light can propagate around an outer edge or circumference of the ring or disk. An emitter can (as described elsewhere herein) include a grating on an outer or inner side wall, or on top, e.g., of the microresonator emitters. Gratings can comprise a periodic structure and can be designed to phase-match. That is, the periodicity of the grating can be configured to allow diffraction from the guided modes to the free space.

The optical switch array can comprise a plurality of optical switches to guide light from the input 140 to one or more emitters and/or groups of emitters in order to achieve a desired output through the lens 130. As illustrated in FIG. 1, an optical switch can be placed at a junction between two pairs of waveguides and a subsequent junction between waveguides. An optical switch array can be controlled with electrical signals, which can allow for switching light to different emitters. The emitter allows coupling light from the guided mode in the waveguide to the free space.

In some embodiments, the lens 130 is a metasurface lens. Metasurface lenses can comprise a plurality of structures, e.g., pillars 135, that can precisely direct received light, e.g., by altering a phase, polarization, spectrum, etc., to generate a specific output. It should be understood that a lens can include pillars of the same size and shape, but can also include pillars of different sizes and shapes.

FIG. 1B illustrates this concept by showing beam steering from different emitters. In the example, the lens is placed at a distance f from the emitters, where f is the focal length of the lens. A first emitter 170 can direct a light beam through the metasurface lens and the metasurface lens collimates the beam 175. The collimated beam 175 travels substantially parallel to the direction of emission from emitter 170. When a second emitter 180 emits light through the metasurface lens, the resulting collimated beam 185 is redirected at angle $\Theta$, e.g., 30°, from the initial direction of emission, which angle can be different from the angle at which the beam from the first emitter is directed.

In addition, metasurface lenses in accordance with embodiments discussed herein can have various thicknesses, concavities, and pillar shapes and sizes on the surface of the lens. Pillar sizes can affect the phase profile of the lens 130, and various pillar sizes can, for example, result in a metasurface lens having a phase profile of a particular focal length. In addition, various pillar sizes and configurations allow for an aberration-corrected, specifically defined imaging properties. In embodiments, metasurface lenses are flat. Lattice constants of pillars can be 800 nm, less than one wavelength, or less than one half a wavelength of received light. Lenses having various Strehl ratios, e.g., greater than 0.8, can be used. In some embodiments, the wavelength error can be less than one-tenth, or less than one-fifth of a wave, on an RMS basis.

By further reference to FIGS. 1A-1B, the beam-steering mechanism can operate when light is input into the optical switch array. By applying an appropriate control signal (e.g., an electrical signal), the optical switch array can guide the light through one or more optical switches 110 to a single emitter 120 and/or multiple emitters. As discussed above, light emitted from each emitter can then be collected by the lens to form a collimated beam, for example. By applying different signals (e.g., electrical signals) to the optical switch array, one can switch light between different emitters and thus change the light emitting position. The lens 130 can perform spatial Fourier transform to the emitted light. Therefore, light emitted from a different position forms a collimated beam pointing in a different direction, as shown by FIG. 1B. As a result, a steerable beam is formed, of which the direction is controlled by the electrical signals applied to the optical switch array. The disclosed devices can also perform beam receiving. Due to the reciprocity of light, a device that forms a beam at the output 160 can also receive a light beam when the light beam is sent to the device in the reversed direction. As an example, the device shown in FIG.

1A is a beam-steering device; such a device can become a beam-receiving device if input 140 and output 160 ports are reversed.

To achieve a large steering angle, the lens can provide a high numerical aperture and good correction of off-axis aberration. More specifically, the lens can provide diffraction-limited performance at large angles. This can be done very compactly with a metasurface lenses or compound lenses fabricated with two-photon direct writing. In particular, metasurface lenses (or called meta-lens in some literatures), which can comprise many subwavelength resonators, have been shown to meet these requirements. It has been shown that metasurface lenses can provide diffraction-limited performance up to 30 degrees. See A. Arbabi, E. Arbabi, S. M. Kamali, Y. Horie, S. Han, and A. Faraon, "Miniature optical planar camera based on a wide-angle metasurface doublet corrected for monochromatic aberration," *Nature Communications* 7, 13682 (2016). One can also, however, use conventional lenses made by machining or molding.

To optimize the light collection by the lens, the optimal emitter size can be based on $d_{opt}=(4/\pi)(\lambda f/D)$, where $\lambda$ is the wavelength of the light; f is the focal length of the lens; D is the diameter of the lens. To realize a practical beam-steering and receiving device, one can select an emitter size d at least smaller than 10 times the optimal emitter size, i.e., $$d < 10\, d_{opt}.$$

Figure 2:
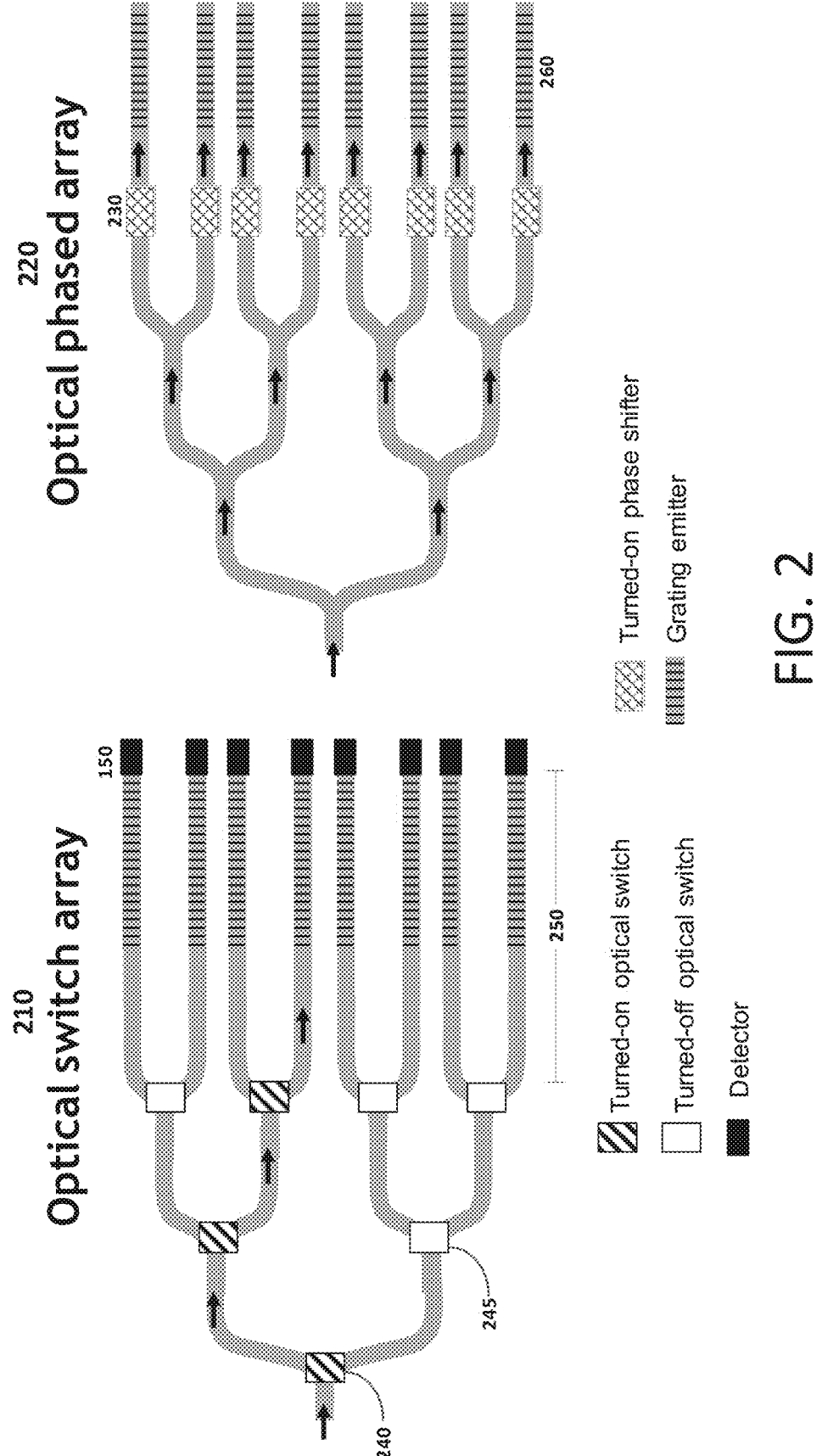
FIG. 2 illustrates a comparison between the disclosed method, which is based on an optical switch array, and a conventional method, which is based on an optical phased array.

One advantage of the disclosed method over conventional methods (based on optical phased array) is that the disclosed technology can consume less power. A comparison of the power consumption between these two methods is demonstrated by FIG. 2, which illustrates an optical switch array comprising 8 waveguides.

In an optical phased array 220, light is distributed to all the emitters, e.g., grating emitters 260. To coherently synthesize a beam, an optical phased array requires turning on all the phase shifters 230 simultaneously. By contrast, the disclosed technology only requires turning on the optical switches along the path to a single emitter. As such, energy can be focused on the one or more desired emitters.

To demonstrate the power saving effects, one can take an optical phased array of 1024 emitters as an example. Such an array consumes power of $1024P_\pi$ on average, where $P_\pi$ is the power required for a phase shifter to create a $\pi$ phase shift. On the other hand, an optical switch array of 1024 emitters only requires turning on 10 optical switches ($\text{Log}_2$ 1024=10). Because on average each optical switch consumes $P_\pi/2$, the power consumption of a 1024 optical switch array is only $5P_\pi$. Therefore, in this example of 1024 emitters, the disclosed technology consumes approximately 205 times less power than the conventional method.

Another advantage of the disclosed method is the ability to perform straightforward feedback control, which enables robustness under the variations of environmental conditions. When environmental conditions (especially the temperature) change, the refractive index of the waveguides can change due to the thermo-optic effect. As a result, a user may need to re-optimize the electrical signals for steering the beam to a particular direction.

As shown by the optical switch array 210 in FIG. 2A, detector(s) 150 can be disposed at the end of waveguide(s) 250. Input travels along a path defined by tuned-on optical switch(es) 240 and does not travel past the turned-off optical switches 245. By adjusting the electrical signals to the optical switches 240, 245 such that the power to a specific detector 150 is maximized, the environmental temperature change can be accommodated in real time. This cannot be done in a simple configuration for conventional optical phased arrays, as doing so would require monitoring the phase of all emitters simultaneously. This feedback control feature is a further advantage of the disclosed method. For example, one can use the disclosed methods without feedback control if the environmental condition does not vary significantly with time.

In addition, the disclosed method is inherently more robust than the conventional method because the beam direction is based on digital control. By contrast, the beam direction in the conventional optical-phased-array method is based on analog control, which can exhibit severe beam drifting problem under variation of environmental conditions or electrical signals.

Figures 3A, 3B:
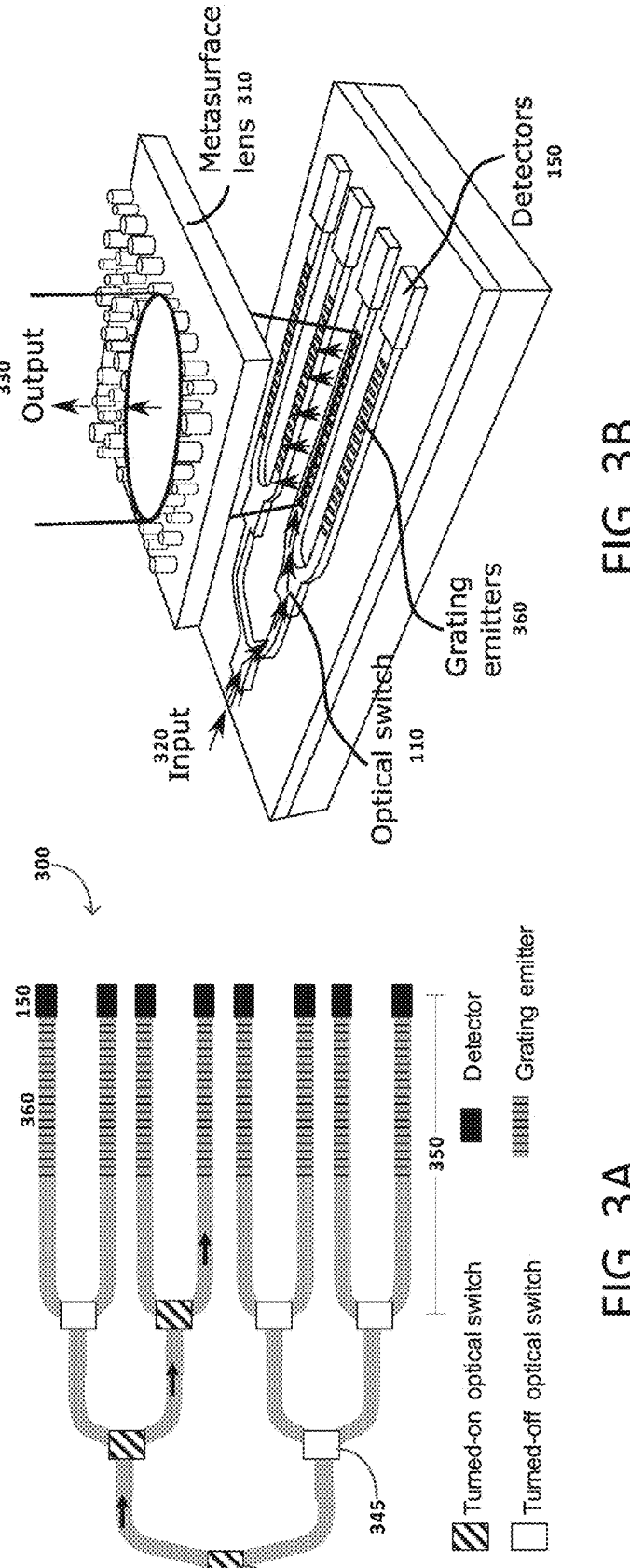
FIG. 3A illustrates a schematic representation of a device for combing 1D beam steering with an optical switch array and another 1D steering with wavelength tuning in accordance with aspects of the present disclosure.
FIG. 3B illustrates a schematic representation of the device of FIG. 3A.

The disclosed method can be implemented in various configurations. In the exemplary aspect shown in FIGS. 3A-B, a one-dimensional beam steering can be implemented with an optical switch array 300 and employ wavelength tuning for the other dimension. In embodiments, as discussed herein, a plurality of optical switches, e.g., turned-on 340 and turned-off switches 345, detectors 150 at the end of each waveguide 350, and grating emitters 360 can be used to generate an output 330 from input 320. In this case, the lens 310 can have bending power in one dimension (e.g., a cylindrical lens).

Figure 4B:
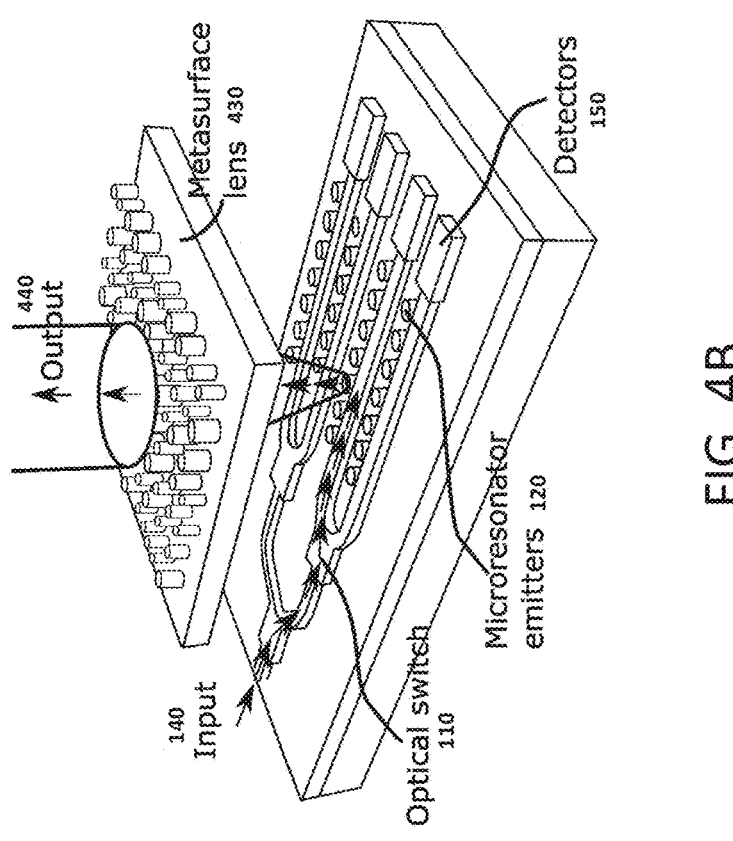
FIG. 4B illustrates a schematic representation of the device of FIG. 4A.
Figure 4A:
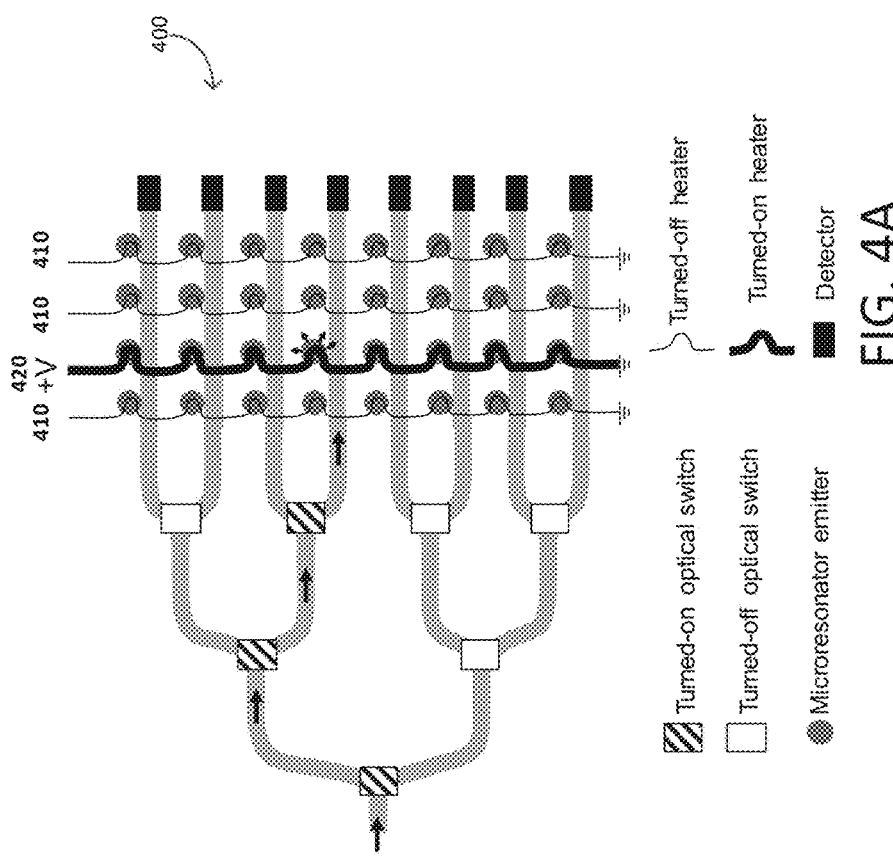
FIG. 4A illustrates a schematic representation of a device that realizes 2D beam steering and receiving with an optical switch array in accordance with aspects of the present disclosure.

In a second aspect, shown in FIGS. 4A-B, two-dimensional beam steering can be implemented with an optical switch array 400 without relying on wavelength tuning. This eliminates the requirement of using a laser source with wide tunable bandwidth. As shown by FIG. 4A, the light between different rows of waveguides can be switched with the optical switch array. In each row, there can be multiple microresonator emitters coupled to that waveguide.

In one exemplary embodiment, heaters 410, 420 can be disposed and configured within one or more columns (or other arrangements) of the emitters, e.g., microresonator emitters. If (again, by reference to FIG. 4) the heater of a specific column is turned on 420, the microresonator emitters in that column are brought into resonance and can emit light. By controlling a row with the optical switch array and a column with a specific heater, one can arbitrarily switch light emitting position to any one of the emitters. The lens 430 has bending power in both dimensions, which collimates the light emitted by any microresonator emitter and forms a beam output 440. Such a configuration realizes full two-dimensional beam steering to (N+1)M angles, with only (N+M) electrical signal channels, where N is the number of optical switches, and M is the number of columns. This technology is thus scalable and adaptable to a variety of settings.

Figure 5:
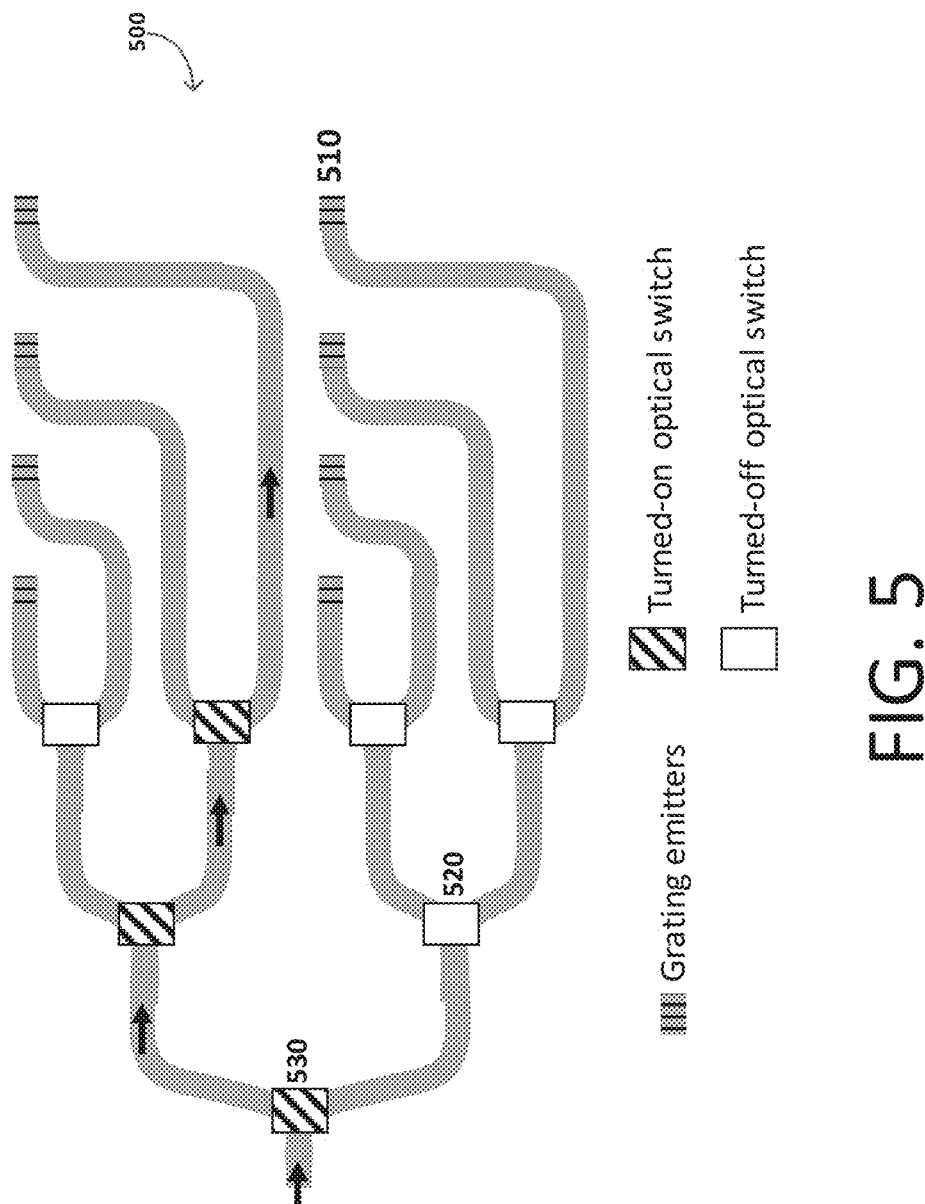
FIG. 5 illustrates a schematic representation of a device that realizes full 2D beam steering and receiving with an optical switch array in accordance with aspects of the present disclosure.

In a third aspect shown in FIG. 5, grating emitters 510 can be arranged on a two-dimensional rectangular grid. This realizes full two-dimensional beam steering with an optical switch array 500 only, without relying on wavelength tuning. This variation, again through one or more turned-off 520 and turned-on 530 switches can steer a beam to N+1 different angles by controlling N electrical signal channels. For the avoidance of doubt, the variations in FIGS. 3, 4 and 5 are described for exemplary purposes only and are not limited to the specific methods and devices described. For example, one can implement only one-dimensional beam steering without combining with wavelength tuning. One can also place the emitters on a more generalized grid, such as circular, triangular, and non-uniform grid.

It should also be understood that the disclosed beam-steering devices described here can also perform beam receiving. This can be accomplished, e.g., in configurations where the input and output ports are reversed.

Exemplary Embodiments

The following embodiments are exemplary only and do not limit the scope of the present disclosure or the appended claims.

Embodiment 1. An optical apparatus comprising: an optical switch array comprising a plurality of optical switches configured to selectively route light to one or more of a plurality of waveguides; a plurality of emitters, wherein at least one emitter of the plurality of emitters is disposed in communication with the one or more of the plurality of waveguides and configured to receive light and cause at least a portion of the light to exit the waveguide; and a lens disposed to receive light exiting the one or more of a plurality of waveguides via the at least one emitter, wherein the lens is configured to direct the received light as an optical output, and wherein the position of the at least one emitter relative to the lens facilitates beam steering of the optical output.

Embodiment 2. The optical apparatus of Embodiment 1, wherein the optical switch array is controllable (e.g., electrically controlled) to toggle a state of one or more of the plurality of optical switches.

Embodiment 3. The optical apparatus of any one of Embodiments 1-2, wherein at least some of the optical switches are configured in series so as to define an optical path to one or more of the plurality of emitters.

Embodiment 4. The optical apparatus of any one of Embodiments 1-3, wherein at least some of the optical switches are configured to define parallel optical paths, and wherein light is routed to at least one of the parallel paths.

Embodiment 5. The optical apparatus of any one of Embodiments 1-4, wherein at least one of the plurality of emitters comprises a grating, e.g., a grating emitter.

Embodiment 6. The optical apparatus of any one of Embodiments 1-5, wherein at least one of the plurality of emitters comprises a microresonator emitter.

In an exemplary such emitter, the emitter can have the configuration of a ring or a disc, and illumination can propagate around the outer edge (e.g., circumference) or the disc or ring. The microresonator can also comprise a structure formed by reflecting faces on the two sides of a spacer layer or optical medium. Ring- and disc-type microresonators are considered especially suitable.

As described elsewhere herein, an emitter can also include a grating (e.g., a periodic structure). The grating can be, e.g., present on or within the emitter; a grating can be formed in the material of the emitter, but can also be a separate structure that is applied to or otherwise disposed on the emitter.

A grating can be present on an outer wall of the emitter, e.g., the side, top, or outer wall of a microresonator ring or disc. A grating can also be configured to phase-match, e.g., the periodicity of the grating can be configured to allow light diffraction from the guided modes within the microresonator to the free space. For example, for a microresonator with the $p^{th}$ longitudinal mode, the periodicity of the grating in angle can be $2\pi/p$, $2\pi/(p\pm1)$, $2\pi/(p\pm2)$, $2\pi/(p\pm3)$, and so on.

Embodiment 7. The optical apparatus of Embodiment 6, further comprising one or more thermal elements configured to selectively modulate heat application to one or more of the plurality of the microresonator emitter. Such a thermal element can be, e.g., a heater or other modality configured to supply (or remove) heat. Such an element can be, e.g., an on/off heater; such an element can also be a heater capable of applying variable amounts of heat.

Embodiment 8. The optical apparatus of any one of Embodiments 1-7, wherein at least some of the plurality of emitters are arranged to define a two-dimensional grid pattern. The emitters can be arranged in a periodic pattern, but this is not a requirement. The arrangement of emitters can be in a square (e.g., 10×10) pattern, but this is not a requirement, as emitters can be arranged in a non-square pattern, e.g., 10×5. Emitters can also be arranged in a circular, ovoid, or other pattern, depending on the needs of the user.

Embodiment 9. The optical apparatus of any one of Embodiments 1-7, wherein groups of the plurality of emitters are arranged to define a linear pattern to facilitate one dimensional beam steering of the optical output.

Embodiment 10. The optical apparatus of any one of Embodiments 1-9, wherein the lens comprises a metasurface lens. (As described elsewhere herein, traditional lenses can also be used.)

A metasurface lens can be a lens having, e.g., lithographically defined features thereon. Such features can include, e.g., pillars, columns, mesas, and the like. The features can be sub-wavelength features so as to manipulate a wavefront in a desired manner. The features can be arranged in a periodic or aperiodic fashion. As an example, the lattice constant on a metasurface can be less than 1 wavelength; for example, the lattice constant of the pillars on a metasurface can be about 800 nm, which is about ½ of a wavelength for some illuminations.

A lens can be configured such that the lens is well-corrected for aberrations. A lens can also be configured such that the lens has a Strehl ratio of greater than about 0.8. A lens can be configured such that the lens has a wavefront error of less than about ⅒ or about ⅕ of a wave, on an RMS basis. A lens can be configured such that it produces a spot diagram with majority of points inside the Airy disk.

Embodiment 11. The optical apparatus of any one of Embodiments 1-10, wherein the lens is configured to collimate received light into a beam of the optical output.

Embodiment 12. The optical apparatus of any one of Embodiments 1-11, further comprising one or more detectors. A detector can be a detector configured to, e.g., monitor the optical power in one or more of a plurality of waveguides.

Embodiment 13. A method of making the optical apparatus of any one of Embodiments 1-12.

Embodiment 14. A method of using the optical apparatus of any one of Embodiments 1-12.

Embodiment 15. The method of Embodiment 14, further comprising using wavelength tuning to facilitate at least a portion of the beam steering of the optical output.

Embodiment 16. An optical apparatus comprising: an optical switch array comprising a plurality of optical switches configured to selectively route light to one or more of a plurality of waveguides; a plurality of receivers, wherein at least one receiver of the plurality of receivers is disposed in communication with the one or more of the plurality of waveguides and configured to receive light and cause at least a portion of the light to be coupled to the one or more of the plurality of waveguides; and a lens disposed to receive light and to direct light toward the at least one receiver, wherein the lens is configured to direct the received light as an optical input to the at least one receiver, and wherein the position of the at least one receiver relative to the lens facilitates receipt of the directional beam optical input.

Embodiment 17. The optical apparatus of Embodiment 16, wherein the optical switch array is controllable to toggle a state of the plurality of optical switches.

Embodiment 18. The optical apparatus of any one of Embodiments 16-17, wherein at least some of the optical switches are configured in series to define an optical path from one or more of the plurality of receivers.

Embodiment 19. The optical apparatus of any one of Embodiments 16-18, wherein at least some of the optical switches are configured to define parallel optical paths, and wherein light is routed to at least one of the parallel paths.

Embodiment 20. The optical apparatus of any one of Embodiments 16-19, wherein at least one of the plurality of receivers comprises a grating.

Embodiment 21. The optical apparatus of any one of Embodiments 16-20, wherein at least one of the plurality of receivers comprises a microresonator.

Embodiment 22. The optical apparatus of Embodiment 21, further comprising one or more thermal elements configured to selectively modulate heat application to one or more of the plurality of microresonators. Such an element can be, e.g., an on/off heater; such an element can also be a heater capable of applying variable amounts of heat.

Embodiment 23. The optical apparatus of any one of Embodiments 16-22, wherein at least some of the plurality of receivers are arranged to define a two-dimensional grid pattern.

Embodiment 24. The optical apparatus of any one of Embodiments 16-22, wherein groups of the plurality of receivers are arranged to define a linear pattern.

Embodiment 25. The optical apparatus of any one of Embodiments 16-24, wherein the lens comprises a metasurface lens.

Embodiment 26. A method of making the optical apparatus of any one of Embodiments 16-25.

Embodiment 27. A method of using the optical apparatus of any one of Embodiments 16-25.

Embodiment 28. A device, the device comprising an optical apparatus according to any one of Embodiments 1-12. Example devices include, e.g., beam-steering devices, steerable receivers, steerable transmitters, LIDAR devices, and the like.

Embodiment 29. A device, the device comprising an optical apparatus according to any one of Embodiments 16-25.

Those skilled in the art also will appreciate that many additional modifications are possible without materially departing from the novel teachings and advantages of the invention. Accordingly, any such modifications are intended to be included within the scope of this invention as defined by the following exemplary claims.

What is claimed:

1. An optical apparatus, comprising:
an optical switch array comprising a plurality of optical switches configured to selectively route light to be emitted from a respective different position of each emitter of a plurality of emitters; and
a lens disposed to receive the light emitted by the plurality of emitters and configured to perform spatial Fourier transform to the light emitted from each respective different position to transmit the light as a collimated optical output beam directed in a respective different direction.

2. The optical apparatus of claim 1, wherein each emitter of the plurality of emitters is disposed in communication with one or more waveguides and configured to receive light therefrom and cause at least a portion of the light to exit the emitter, wherein the plurality of emitters are arranged to define a two dimensional pattern, and wherein the respective different positions of the emitters relative to the lens facilitates beam steering in two dimensions.

3. The optical apparatus of claim 1, wherein the optical switch array is controllable to toggle a state of the plurality of optical switches.

4. The optical apparatus of claim 1, wherein at least some of the plurality of optical switches are configured in series so as to define an optical path to one or more of the plurality of emitters.

5. The optical apparatus of claim 1, wherein at least some the plurality of optical switches are configured to define parallel optical paths, and wherein light is routed to at least one of the parallel optical paths.

6. The optical apparatus of claim 1, wherein at least one of the plurality of emitters comprises a grating.

7. The optical apparatus of claim 1, wherein at least one of the plurality of emitters comprises a microresonator emitter.

8. The optical apparatus of claim 1, wherein groups of the plurality of emitters are arranged to define a linear pattern to facilitate one-dimensional beam steering.

9. The optical apparatus of claim 1, wherein the lens comprises a metasurface lens.

10. The optical apparatus of claim 1, wherein the optical apparatus is configured with wavelength tuning to facilitate beam steering.

11. An optical apparatus, comprising:
an optical switch array comprising a plurality of optical switches configured to selectively route light received from a respective different position of each receiver of a plurality of receivers; and
a lens disposed to direct received light toward the plurality of receivers wherein the lens is configured to perform spatial Fourier transform to the light received as a directional optical beam input from a respective different direction and to direct the received light toward each respective different position.

12. The optical apparatus of claim 11, wherein each receiver of the plurality of receivers is disposed in communication with one or more waveguides and configured to cause at least a portion of the light received by the receiver to be transmitted over the one or more waveguides, wherein the plurality of receivers are arranged to define a two dimensional pattern, and wherein the respective different positions of the receivers relative to the lens facilitates directional optical beam input reception in two dimensions.

13. The optical apparatus of claim 11, wherein the optical switch array is controllable to toggle a state of the plurality of optical switches.

14. The optical apparatus of claim 11, wherein at least some of the plurality of optical switches are configured in series to define an optical path from one or more of the plurality of receivers.

15. The optical apparatus of any claim 11, wherein at least some of the plurality of optical switches are configured to define parallel optical paths, and wherein light is routed from at least one of the parallel optical paths.

16. The optical apparatus of claim 11, wherein at least one of the plurality of receivers comprises a grating.

17. The optical apparatus of claim 11, wherein at least one of the plurality of receivers comprises a microresonator.

18. The optical apparatus of claim 11, wherein groups of the plurality of receivers are arranged to define a linear pattern.

19. The optical apparatus of claim 11, wherein the lens comprises a metasurface lens.

* * * * *